United States Patent
Zhong

(10) Patent No.: US 7,515,763 B1
(45) Date of Patent: Apr. 7, 2009

(54) IMAGE DENOISING BASED ON WAVELETS AND MULTIFRACTALS FOR SINGULARITY DETECTION AND MULTISCALE ANISOTROPIC DIFFUSION

(75) Inventor: Junmei Zhong, Cincinnati, OH (US)

(73) Assignee: University of Rochester, Rochester, NY (US)

( * ) Notice: Subject to any disclaimer, the term of this patent is extended or adjusted under 35 U.S.C. 154(b) by 804 days.

(21) Appl. No.: 11/117,380

(22) Filed: Apr. 29, 2005

Related U.S. Application Data

(60) Provisional application No. 60/566,083, filed on Apr. 29, 2004.

(51) Int. Cl.
*G06K 9/40* (2006.01)
*G06K 9/36* (2006.01)

(52) U.S. Cl. .................. 382/254; 382/240; 382/266

(58) Field of Classification Search .............. 382/266, 382/260, 262, 276, 240, 254; 358/463, 447, 358/448; 348/241, 242, 533, 535, 607, 701
See application file for complete search history.

(56) References Cited

U.S. PATENT DOCUMENTS

| | | | |
|---|---|---|---|
| 6,847,737 B1 * | 1/2005 | Kouri et al. ................ | 382/260 |
| 2006/0034539 A1 * | 2/2006 | Nachlieli et al. ............ | 382/260 |
| 2006/0050783 A1 * | 3/2006 | Le Dinh et al. ........... | 375/240.2 |
| 2006/0167784 A1 * | 7/2006 | Hoffberg .................... | 705/37 |
| 2007/0038691 A1 * | 2/2007 | Candes et al. .............. | 708/400 |

* cited by examiner

*Primary Examiner*—Yon Couso
(74) *Attorney, Agent, or Firm*—Blank Rome LLP

(57) ABSTRACT

A noisy image is transformed through a wavelet transform into multiple scales. The wavelet coefficients are classified at each scale into two categories corresponding to irregular coefficients, edge-related and regular coefficients. Different denoising algorithms are applied to different classes. Alternatively, a denoising technique is applied to the finest scale, and the wavelet coefficients at all scales are denoised through anisotropic diffusion.

4 Claims, 14 Drawing Sheets

IMAGE DENOISING BASED ON WAVELETS AND MULTIFRACTALS FOR SINGULARITY DETECTION AND MULTISCALE ANISOTROPIC DIFFUSION

REFERENCE TO RELATED APPLICATION

The present application claims the benefit of U.S. Provisional Patent Application No. 60/566,083, filed Apr. 29, 2004, whose disclosure is hereby incorporated by reference in its entirety into the present disclosure.

FIELD OF THE INVENTION

The present invention is directed to three techniques for image denoising and more particularly to such a technique which uses wavelets and multifractals for singularity detection to detect the edge-related information so as to preserve the edges of the image while reducing noise. And to such a technique which performs anisotropic diffusion on each scale of wavelet coefficients so as to reduce noise while preserving edges and other important image features.

DESCRIPTION OF RELATED ART

Image denoising is used to improve the quality of an image corrupted with noise due to undesired conditions for image acquisition. In most cases, the image quality is measured by the peak signal to noise ratio (PSNR) or signal to noise ratio (SNR). However, sometimes, for a denoised image with a high PSNR value, its visual quality is not satisfactory. Thus, how to achieve both high PSNR and good visual quality is very important for image denoising. In many applications, such as medical image diagnosis, in addition to the high PSNR, satisfactory visual quality of the denoised image is especially emphasized. For such applications, due to the sensitivity of the human eye to edges, the image denoising will be regarded as unsuccessful if edges are blurred and some new distortions are generated even though the resulting PSNR value is high.

Most of the conventional spatial filtering algorithms are not efficient enough for edge preservation. For example, the mean filter and Gaussian filter have the disadvantage of blurring the edges when reducing noise. Although the median filter can preserve edges, the fine structures are suppressed, and it tends to produce regions of constant or nearly constant intensity in homogeneous image regions. The adaptive minimum mean-square error filter outperforms the two kinds of filters mentioned above by analyzing the local image intensity statistics. However, there is no guarantee that such a denoised image with high PSNR has acceptable visual quality. Some obvious visual artifacts can be seen in the denoised image.

In recent years, wavelet transform has attracted significant attention in scientific research and engineering applications, since it is very powerful for analyzing transient signals/images for its capability of multiresolution analysis with localization in both time/spatial and frequency domains. The wavelet-based multiresolution analysis is very efficient in pattern recognition, image compression and image denoising. However, there is no guarantee for all these denoising techniques that edges can be preserved when high PSNR is achieved for the denoised image. The wavelet transform modulus sum (WTMS) algorithm provides an explicit way for edge preservation based on wavelets for multiscale singularity detection. By thresholding the inter-scale ratio of the sum of wavelet transform modulus within a directional cone of influence (DCOI), the wavelet coefficients at each scale are classified into two categories; one corresponds to edge-related and regular coefficients, and the other corresponds to irregular coefficients. This results in the multiscale edge detection from a noisy image. The irregular coefficients are discarded for noise reduction, while the edge-related and regular coefficients are preserved for retaining good visual quality for the denoised image.

But there are some deficiencies for the WTMS algorithm. First, the irregular coefficients are simply discarded, although this can reduce noise significantly for the irregular coefficients, the actual signal components in these irregular coefficients are also lost. Second, the detected edge-related and regular coefficients are all preserved without doing any modifications. Although this can preserve the edges, this also results in both noisy edges and low PSNR for the denoised image. This is due to the fact that in the wavelet transform domain, noise is dominant at the lowest decomposition level, even for the detected edge-related and regular coefficients, they still contain a lot of noise.

SUMMARY OF THE INVENTION

It is therefore an object of the invention to realize a more efficient denoising algorithm based on wavelets and multifractals for multiscale singularity detection from a noisy image.

To achieve the above and other objects, the noisy image intensity surface is modeled as statistically self-similar multifractal processes, and wavelet transform is used to provide multiresolution analysis for exploring the scaling property of multifractal measures. For each point at a scale, the local singularity strength value is calculated from the inter-scale ratio of the magnitudes of wavelet transform coefficients at the same point at successive two scales. By thresholding the singularity strength, the wavelet coefficients at each scale are classified into two categories. One corresponds to irregular wavelet coefficients, and the other corresponds to edge-related and regular coefficients. Instead of simply discarding the irregular coefficients for noise reduction as done in the WTMS algorithm, we perform the MMSE-based filtering to reduce noise as much as possible and restore the signal components. Rather than simply keeping the noisy edge-related and regular coefficients for reconstructing the denoised image, we use the fuzzy weighted mean (FWM) filter for further smoothing so that noise can be reduced significantly while edges and details can be preserved as much as possible. Furthermore, in order to make the FWM filter more efficient in noise reduction for the finest scale, two passes of denoising operations were performed. The MMSE-based filtering was performed as the first pass of denoising followed by performing the FWM-based filtering for the already denoised finest scale acting as the second pass of smoothing and enhancement. Therefore, both good visual quality and high PSNR were achieved. Experimental results demonstrated that the proposed algorithm could achieve both good visual quality and high PSNR.

The present invention provides a very efficient algorithm for noise reduction and edge preservation. The efficient noise reduction is attributed to the classification of wavelet coefficients at each scale into two categories corresponding to irregular coefficients, edge-related and regular coefficients by using wavelets and multifractals for multiscale singularity detection. The classification result makes it possible to design different denoising algorithms to reduce noise in different classes of wavelet coefficients according to their signal features and noise contents. Since the irregular coefficients are located in the homogeneous regions in the original noise-free image, noise in these coefficients is reduced significantly by performing the MMSE-based filtering without degrading the visual quality of the denoised image. The edge-related and regular coefficients are smoothed with the FWM filter so that noise is reduced with details and edges preserved. Experimental results show that this algorithm can achieve both good visual quality and high PSNR for the denoised image.

BRIEF DESCRIPTION OF THE DRAWINGS

A preferred embodiment of the present invention, and variations thereon, will be set forth in detail with reference to the drawings, in which.

DETAILED DESCRIPTION OF THE PREFERRED EMBODIMENT

Figure 1A:
FIGS. 1A-1C and 2A-2C show original and noisy images.

A preferred embodiment of the present invention, and variations thereon, will be set forth in detail with reference to the drawings, in which like reference numerals refer to like elements or steps throughout.

The two dimensional (2-D) over-complete dyadic wavelet transform (DWT) is used to represent an image for multiresolution analysis, since it can facilitate the exploration of the inter-scale dependence of wavelet coefficients for its property of translation invariance.

Let $\theta(x,y)$ be a 2-D smoothing and twice differentiable function, whose integral is equal to 1 and that converges to 0 at infinity. The two wavelets at horizontal and vertical directions are defined as follows:

$$\psi^1(x, y) = \frac{\partial \theta(x, y)}{\partial x}, \tag{1}$$

$$\psi^2(x, y) = \frac{\partial \theta(x, y)}{\partial y}. \tag{2}$$

The dilation of the 2-D wavelets by scale $2^j$ is denoted by $$\psi_{2^j}^k(x, y) = 2^{-2j}\psi^k\left(\frac{x}{2^j}, \frac{y}{2^j}\right), k = 1, 2 \tag{3}$$

By assuming that an image $f(x,y)$ is a 2-D measurable and square-integrable function such that $f(x,y) \in L^2(R^2)$, the associated 2-D DWT of the image $f$ at scale $2^j$ has two components and is defined as $$W_{2^j}^1 f(x,y) = f * \psi_{2^j}^1(x,y), \tag{4}$$

$$W_{2^j}^2 f(x,y) = f * \psi_{2^j}^2(x,y), \tag{5}$$

where * denotes the convolution operation. By replacing the functions $\psi_{2^j}^1(x,y)$ and $\psi_{2^j}^2(x,y)$ in Eqs. (4) and (5) with those defined in Eqs. (1) and (2), respectively, the two wavelet-transform components can be rewritten as:

$$W_{2^j}^1 f(x, y) = 2^j \frac{\partial}{\partial x}(f * \theta_{2^j})(x, y), \tag{6}$$

$$W_{2^j}^2 f(x, y) = 2^j \frac{\partial}{\partial y}(f * \theta_{2^j})(x, y) \tag{7}$$

where $$\theta_{2^j}(x, y) = 2^{-j}\theta\left(\frac{x}{2^j}, \frac{y}{2^j}\right).$$

The 2-D DWT of $f(x,y)$ is referred to as the set of functions $$WT(f) = (W_{2^j}^1 f(x,y), W_{2^j}^2 f(x,y))_{j \in Z}. \tag{8}$$

The 2-D DWT at each scale can be denoted as $$W_{2^j} f(x, y) = \begin{bmatrix} W_{2^j}^1 f(x, y) \\ W_{2^j}^2 f(x, y) \end{bmatrix} \tag{9}$$

and we have $$W_{2^j} f(x, y) = 2^j \begin{bmatrix} \frac{\partial}{\partial x}(f * \theta_{2^j})(x, y) \\ \frac{\partial}{\partial y}(f * \theta_{2^j})(x, y) \end{bmatrix} = 2^j \nabla (f * \theta_{2^j})(x, y). \tag{10}$$

This indicates that the dyadic wavelet transform $W_{2^j}f(x,y)$ provides multiscale gradient fields and the two wavelet transform coefficients at each point form a gradient vector $\nabla(f*\theta_{2^j})(x,y)$ of the smoothed image $(f*\theta_{2^j})(x,y)$ describing respectively its oriented details in the horizontal and vertical directions. The magnitude and the orientation of the gradient vector of the smoothed image at a particular point (x,y) and scale $2^j$ are defined as $$M_{2^j}f(x,y) = \sqrt{|W_{2^j}^1 f(x,y)|^2 + |W_{2^j}^2 f(x,y)|^2}, \tag{11}$$

$$A_{2^j}f(x, y) = \arctan\frac{W_{2^j}^2 f(x, y)}{W_{2^j}^1 f(x, y)}. \tag{12}$$

When the smoothing function is a Gaussian function, the edge detection from the extrema of $M_{2^j}f(x,y)$ is equivalent to that of the Canny edge detector. In real applications, since images are only measured with a finite resolution, only a finite level of DWT components is constructed for an image $f(x,y)$, with $$WT_J f(x,y) = ((W_{2^j}^1 f(x,y))_{1 \leq j \leq J}, (W_{2^j}^2 f(x,y))_{1 \leq j \leq J}, S_{2^J} f(x,y)), J \in Z. \tag{13}$$

In the preferred embodiment, the smoothing function $\theta(x,y)$ is chosen to be the cubic spline, which closely approximates a Gaussian function. The wavelet in each orientation is the quadratic spline that approximates the first derivative of a Gaussian function. As a result, the DWT works like the Canny edge detector. Wavelet coefficients with large magnitudes usually correspond to edges in the smoothed image. For fast numerical implementation, a fast DWT algorithm has been developed through iterative convolutions with a set of finite impulse response (FIR) low-pass and high-pass filters. In the fast forward DWT, the following components are constructed, with $S_1^d f$ being the input image:

$$WT_j^d f = ((W_{2^j}^{1,d} f)_{1 \le j \le J}, (W_{2^j}^{2,d} f)_{1 \le j \le J}, S_{2^j}^d f). \tag{14}$$

From these components, the input image can be reconstructed using the fast inverse DWT.

Wavelet-based multifractal analysis for singularity detection will now be disclosed. The singularity of a noisy image characterizes the visual roughness of the noisy image intensity surface and is usually quantitatively characterized by analyzing the Hölder exponent (also called as Lipschitz exponent) of the noisy image. Images with a large Hölder exponent appear to be smooth, while small Hölder exponents are associated with relatively rougher functions.

Given a function $f: R \rightarrow R$, that function has a Hölder exponent $\alpha = n+r$ with $n \in N$ and $0 \le r \le 1$ if there exists a constant $K < \infty$, such that $$|f^n(y) - f^n(x)| \le K|y-x|^r \; \forall x, y \in R. \tag{15}$$

The Hölder exponent essentially indicates the number of continuous derivatives that a function possesses. For example, a signal that is once differentiable has Hölder exponent 1, a step function has Hölder exponent 0, and a Dirac impulse has Hölder exponent −1. When the Hölder exponent value is negative, the smaller the Hölder exponent is, the more singular the signal is. Noise is singular anywhere.

Although the global Hölder exponent of a function can be measured by means of the Fourier transform, such a measurement is not very useful for analyzing transient signals, since it cannot provide information regarding the location and spatial distribution of singularities. By taking advantage of the compactly supported wavelet frames and bases, the information about the local Hölder exponent at a certain point can be provided, since wavelets can provide localization in both spatial and frequency domains. It has been proposed to estimate the Lipschitz exponent of a singularity by tracing its wavelet transform modulus maxima (WTMM) curves across scales inside the cone of influence (COI). It has been demonstrated that the local regularity of certain types of non-isolated singularities in the signals can be characterized by using the WTMM. However, there may be some errors and ambiguities in tracing the maxima curves in scale space. The accuracies of the estimated Lipschitz exponents will be affected when the singularities are not isolated, which means that the COI's of these singularities have common support. In a simpler but also efficient way to estimate the Lipschitz exponent through the inter-scale ratio of the wavelet transform modulus sum (WTMS) within a COI, in particular, for 2-D images, the Lipschitz exponent is estimated from the inter-scale ratio of WTMS within a directional cone of influence (DCOI). In the WTMS algorithm, the DCOI of a point $(x_0, y_0)$ at scale $2^j$ is defined as the following:

$$DCOI_{(x_0, y_0)}^j = \tag{16}$$
$$\left\{ (x, y) : (x - x_0)^2 + (y - y_0)^2 \le K 2^{2j}, \frac{y - y_0}{x - x_0} = \tan(A_{2^j} f(x_0, y_0)) \right\}.$$

where $A_{2^j} f(x_0, y_0)$ is defined in Eq. (12). But, in numerical calculations, to determine the DCOI for each point, linear interpolation has to be performed within a disk region, since not all wavelet coefficients lie on the direction indicated by $A_{2^j} f(x_0, y_0)$. By thresholding the inter-scale ratio of WTMS within a DCOI, wavelet coefficients at each scale are classified into two categories; one corresponds to the irregular coefficients and the other corresponds to the edge-related and regular coefficients.

In the preferred embodiment, a method based on wavelets and multifractals for singularity detection is used to obtain the pointwise singularity strength based on which the classification of wavelet coefficients results. But the computational complexity is much reduced.

A typical property of fractals is that they are locally self-similar at a small range of scales. Define the fractal measure $\mu$ as the mass of an $\epsilon$-radius ball, $B(x, \epsilon)$, centered at an arbitrary point x on a fractal object, with $$\mu(B(x, \varepsilon)) = \int_{B(x, \varepsilon)} d\mu \tag{17}$$

Looking near the point x at different scales, and disregarding the anisotropy, a fractal measure scales like $$\mu(B(x, \lambda \epsilon)) \sim \lambda^{\alpha(x)} \mu(B(x, \epsilon)), \tag{18}$$

where $\lambda$ is a scalar number, and $\alpha(x)$ is the scaling exponent indicating the singularity strength. Since fractals are non-uniform, it is insufficient to use one single scaling exponent $\alpha(x)$ for singularity characterization and usually, the following pointwise self-similarity has to be considered.

$$\mu(B(x_0, \lambda \epsilon)) \sim \lambda^{\alpha(x_0)} \mu(B(x_0, \epsilon)) \tag{19}$$

When wavelet transform is used to do multiscale analysis for the self-similar fractal measures, the location information concerning the spatial distribution of the singularities is collected, and the singularity characterization is very straightforward. Given a wavelet function defined as $$\psi_{a,b}(x) = \frac{1}{a} \psi\left(\frac{x - b}{a}\right), \tag{20}$$

which decays sufficiently fast at infinity, where a, b are respectively the scale parameter and translation parameter, define the wavelet transform (WT) of the fractal measure $\mu$ as:

$$WT_\psi(a, b) = \frac{1}{a} \int \psi^*\left(\frac{x - b}{a}\right) d\mu(x), \tag{21}$$

where * denotes the complex conjugate. Then, for a singular point $x_0$, and a non-integer local singularity strength $\alpha(x_0)$, the scaling property of a fractal measure can be mirrored by the wavelet transform as $$WT_\psi(\lambda a, x_0 + \lambda b) \sim \lambda^{\alpha(x_0) - 1} WT_\psi(a, x_0 + b). \tag{22}$$

Furthermore, the scaling property can be mirrored as $$WT_{104}(\lambda a, b) \lambda \tilde{J} 0 \lambda^{\alpha(b)} WT_{104}(a, b). \tag{23}$$

In addition, it is pointed out that the scaling property in Eq. (22) and Eq. (23) can be numerically studied in the same way.

In Eq. (22), both b and $\lambda$ must be very small so that the self-similarity defined in Eq. (19) can be satisfied. For Eq. (22), when b=0, it has the same meaning as Eq. (23), and Eq. (22) becomes $$WT_\psi(\lambda a, x_0) \sim \lambda^{\alpha(x) - 1} WT_\psi(a, x_0). \tag{24}$$

Thus, we have an inter-scale relationship for the wavelet coefficients at the same point at two scales. In 2-D image domain, by assuming $f(x_0,y_0)$ be a singular point of image $f(x,y)$, using the translation-invariant overcomplete DWT, we can have the following inter-scale scaling property:

$$wt_{2^{j+1}}^{1,d}(x_0,y_0) \sim 2^{\alpha_{2^j}(x_0,y_0)-1} wt_{2^j}^{1,d}(x_0,y_0) \quad (25)$$

$$w_{2^{j+1}}^{2,d}(x_0,y_0) \sim 2^{\alpha_{2^j}(x_0,y_0)-1} w_{2^j}^{2,d}(x_0,y_0) \quad (26)$$

where $w_{2^{j+1}}^{k,d}(x_0,y_0)$, k=1 or 2, denotes the wavelet coefficients at positions $(x_0,y_0)$ in the wavelet transform component $w_2^{k,d}f$ in Eq. (14). Thus, we have $$[wt_{2^{j+1}}^{1,d}(x_0,y_0)]^2 \sim 2^{2*(\alpha_{2^j}(x_0,y_0)-1)}[wt_{2^j}^{1,d}(x_0,y_0)]^2 \quad (27)$$

$$[wt_{2^{j+1}}^{2,d}(x_0,y_0)]^2 \sim 2^{2*(\alpha_{2^j}(x_0,y_0)-1)}[wt_{2^j}^{2,d}(x_0,y_0)]^2 \quad (28)$$

$$[wt_{2^{j+1}}^{1,d}(x_0,y_0)]^2+[wt_{2^{j+1}}^{2,d}(x_0,y_0)]^2 \sim 2^{2*(\alpha_{2^j}(x_0,y_0)-1)} \\ ([wt_{2^j}^{1,d}(x_0,y_0)]^2+[wt_{2^{j+1}}^{2,d}(x_0,y_0)]^2) \quad (29)$$

with Eq. (11), we have $$M_{2^{j+1}}(x_0,y_0) \sim 2^{\alpha_{2^j}(x_0,y_0)-1} M_{2^j}(x_0,y_0). \quad (30)$$

This means that the local singularity strength $\alpha_{2^j}(x_0,y_0)$ at each scale $2^j$ can be estimated from the inter-scale ratio of the wavelet coefficient magnitudes at the point $(x_0,y_0)$ at successive two scales, with $$\alpha_{2^j}(x_0,y_0) \sim \log_2 \frac{M_{2^{j+1}}(x_0,y_0)}{M_{2^j}(x_0,y_0)} \quad (31)$$

Eqs. (22), (23) and (31) indicate that the singularity detection will not be affected by the singularities nearby. With the pointwise singularity strength, the classification of wavelet transform coefficients at each scale can be accomplished by thresholding the pointwise singularity strength $\alpha_{2^j}(x_0,y_0)$. Since it has been pointed out that for step edges, the wavelet coefficient magnitude at one point will be the same at different scales, and for regular signals, their wavelet coefficient magnitudes have a rapid decay as the scale decreases, while for noise, its wavelet coefficient magnitude decreases as the scale increases, the threshold of $\alpha_{2^j}(x_0,y_0)$ can be set around 1.0. If $\alpha_{2^j}(x_0,y_0)$ is above the threshold, the wavelet coefficient at $(x_0,y_0)$ is classified as an edge-related and regular coefficient; otherwise, it is classified as an irregular coefficient. In real applications, we do not need to directly calculate the singularity strength value; we only need to calculate the inter-scale magnitude ratio of $M_{2^{j+1}}(x_0,y_0)$ and $M_{2^j}(x_0,y_0)$, and the inter-scale magnitude ratio threshold is set around 1.0.

Figure 2A:
Figure 1B:
Figure 2B:
Figure 1C:
Figure 2C:
Figure 3A:
FIGS. 3A-3D show the classification of noisy wavelet coefficients in the images of FIGS. 1A-1C and 2A-2C.
Figure 3B:
Figure 3C:
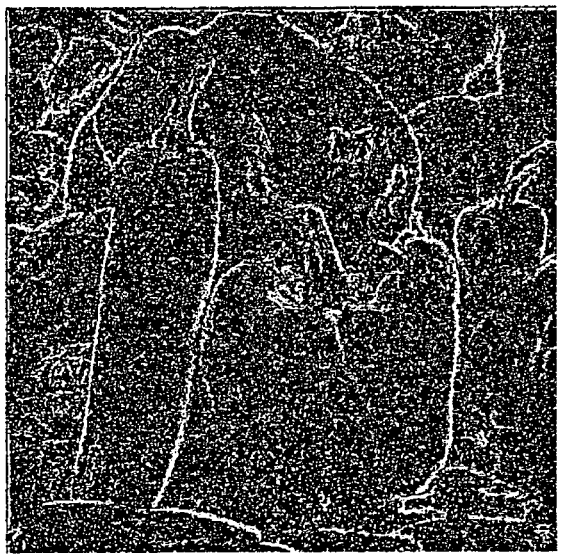
Figure 3D:

For demonstrating the classification performance using the proposed method, two noisy images of Peppers and Lena are used for testing. FIGS. 1A and 2A are the original images. The noisy images shown in FIGS. 1B, 1C, 2B and 2C are generated with the additive white Gaussian noise of variance 400 (for FIGS. 1B and 2B) and 1000 (for FIGS. 1C and 2C), added to the noise-free images. For the lowest decomposition level of the four noisy images, the classification results are displayed in FIGS. 3A-3D, in which FIGS. 3A and 3B are the classification results for the noisy images of Peppers and Lena, respectively, with noise variance 400, while FIGS. 3C and 3D are those for the noisy images of Peppers and Lena, respectively, with noise variance 1000. The black pixels stand for irregular coefficients, while the white pixels stand for edge-related and regular coefficients. It can be observed that edges are detected from the noisy images even though the noise variance is high. But, when noise variance is 1000, some weak edges cannot be detected compared with the case when noise variance is 400.

The denoising algorithm will now be disclosed. In the proposed denoising algorithm, the noisy image intensity surface is modeled as statistically self-similar multifractal processes, and the wavelet-based multiresolution analysis is performed to exploit the self-similar multifractal measures. The pointwise singularity strength characterizing the local singularities are captured from the inter-scale ratio of the wavelet coefficient magnitudes at the same position at successive two scales. By thresholding the singularity strength, wavelet coefficients at each scale are classified into two categories: one corresponds to the edge-related and regular coefficients, and the other corresponds to the irregular coefficients. With this classification result, it is possible to design different denoising approaches for different classes of wavelet coefficients according to their signal features and noise contents, so as to achieve both high PSNR and good visual quality for the denoised image. For the irregular coefficients, the MMSE-based filtering is performed to reduce noise as much as possible, while the edge-related and regular coefficients are filtered with the FWM filter to preserve edges and textures when reducing noise. Since the irregular coefficients are mostly located at the homogeneous regions of the noise-free image, the MMSE is very efficient for noise reduction. On the other hand, since in wavelet transform domain, noise tends to be decreased as the decomposition level is increased, the FWM-based filtering becomes more and more efficient for noise smoothing and edge preservation. This is due to the fact that when the FWM-based filtering is performed on wavelet transform domain, the weights of the FWM filter are the Gaussian function of the wavelet coefficient difference between the central wavelet coefficient and its neighboring wavelet coefficients. As the decomposition level is increased, noise tends to be decreased, and it has less influence on the calculation of the coefficient difference, making the weights of the FWM filter more reliable and the FWM-based filtering more efficient accordingly. However, the FWM-based filtering is not very efficient for the finest scale since wavelet coefficients there contain most of the noise in the original noisy image, and the calculation of the difference of wavelet coefficients is much influenced by noise, resulting in the non-reliable weight estimation for the FWM filter. Therefore, the direct application of the FWM filter to the finest scale is not very efficient for noise reduction. To circumvent this problem, two passes of denoising (operations) were performed for the edge-related and regular coefficients located at the finest scale. The MMSE-based filtering was performed as the first pass of denoising followed by performing the FWM-based filtering acting as the second pass of further denoising.

By assuming that the image is corrupted by the additive white Gaussian noise (AWGN) with variance $\sigma_n^2$, let us call the noisy image $f_n(x,y)$, so that $$f_n(x,y) = f(x,y) + n(x,y), \text{ for } x,y = 0, 1, 2, \ldots M-1 \quad (32)$$

where $n(x,y)$ is the noise term, $f(x,y)$ is the noise-free image, and M is the image dimension in each row and column. If we apply the wavelet transform (WT) to the noisy image $f_n(x,y)$, we get $$WT(f_n(x,y)) = WT(f(x,y)) + WT(n(x,y)). \quad (33)$$

If we consider $n(x,y)$ as an independent identically distributed random variable with a Gaussian probability density function of zero-mean and a variance of unity, then we can obtain the wavelet transform of an image contaminated by an AWGN with variance $\sigma_n^2$ as the following:

$$WT(f_n(x, y)) = WT(f(x, y)) + WT(\sigma_n * n(x, y)) \quad (34)$$

$$= WT(f(x, y)) + \sigma_n * WT(n(x, y))$$

So, the dyadic wavelet transform of a noisy image can be rewritten as $$wt_{2^j}^{k,d}(x,y) = w\hat{t}_{2^j}^{k,d}(x,y) + wtn_{2^j}^{k,d}(x,y),$$
$$\text{for } x,y = 0, 1, 2, \ldots M-1, k=1, 2. \quad (35)$$

where $w\hat{t}_{2^j}^{k,d}(x,y)$ denotes the wavelet coefficient of a noise-free image $\hat{f}(x,y)$ at location $(x,y)$ and scale $2^j$ in the wavelet transform component $W_{2^j}^{k,d}\hat{f}, k=1$ or 2 in Eq. (14), $wt_{2^j}^{k,d}(x,y)$ denotes the observed wavelet coefficient of the noisy image in the wavelet transform component $W_{2^j}^{k,d}f$, and $wtn_{2^j}^{k,d}(x,y)$ denotes the wavelet coefficient of the zero-mean and a $\sigma_n^2$-variance additive white Gaussian noise in the wavelet transform component $W_{2^j}^{k,d}f, k=1$ or 2.

The wavelet coefficients $w\hat{t}_{2^j}^{k,d}(x,y)$ of the noise-free image are assumed to be conditionally independent zero-mean Gaussian random variable $N(0, \sigma_{(x,y)}^0)$, given their variances $\sigma_{(x,y)}^2$. Those variances $\sigma_{(x,y)}^2$ are modeled as identically distributed, highly correlated random variables. The maximum likelihood (ML) estimation of the local variance $\sigma_{(x,y)}^2$ is obtained from the observed local noisy wavelet coefficients as the following:

$$\hat{\sigma}_{(x,y)}^2 = \max\left\{0, \frac{1}{|N_{(x,y)}|} \sum_{(p,q) \in N_{(x,y)}} [w t_{2^j}^{k,d}(p,q)]^2 - \sigma_n^2\right\}, \quad (36)$$

$$k = 1 \text{ or } 2$$

where $N_{(x,y)}$ denotes the spatial neighborhood of the position of $wt_{2^j}^{k,d}(x,y)$ at location $(x,y)$ in the wavelet transform component $W_{2^j}^{1,d}f$ or $W_{2^j}^{2,d}f$ in Eq. (14), $|N_{(x,y)}|$ denotes the number of neighbors in $N_{(x,y)}$. The neighborhood $N_{(x,y)}$ is defined as a square window centered at the position of $wt_{2^j}^{k,d}(x,y)$. The noise standard deviation $\sigma_n$ can be estimated using a robust estimation, the median absolute deviation of wavelet coefficients in the lowest decomposition level divided by 0.6745, $$\hat{\sigma} = \text{Min}(\text{Median}(|wt_{2^1}^{k,d}(x,y)|)/0.6745, k=1, 2) \quad (37)$$

where $wt_{2^j}^{k,d}(x,y)$ denotes the noisy wavelet coefficients at the lowest decomposition level.

After the variance of local noise-free wavelet coefficients is estimated, the noise-free wavelet coefficient value of $w\hat{t}_{2^j}^{k,d}(x,y)$ at the wavelet transform component of $W_{2^j}^{1,d}f$ or $W_{2^j}^{2,d}f$ is estimated by the following:

$$w\hat{t}_{2^j}^{k,d}(x,y) = \frac{\hat{\sigma}_{(x,y)}^2}{\hat{\sigma}_{(x,y)}^2 + \sigma_n^2} wt_{2^j}^{k,d}(x,y). \quad (38)$$

For the class of edge-related and regular coefficients, it is necessary to do further noise reduction since they still contain some amount of noise, especially when they are located at the lowest decomposition level. However, since most of the wavelet coefficients in this class directly correspond to the edges of the image and they play an important role in achieving good visual quality for the denoised image, the modification of them must be made very carefully, otherwise, edges will be blurred with visual distortions generated. In the preferred embodiment, the fuzzy weighted mean (FWM) filter is used aiming at preserving the details and textures when smoothing out noise.

The FWM filter was originally applied to the noisy image domain (which is called the single-scale FWM-based filtering here) aiming at removing the impulse noise and Gaussian noise while preserving the details and textures. However, since the weights of the FWM filter are dependent upon the calculation of the image intensity difference between the central pixel and its neighbors, but the intensity difference is very sensitive to noise, which makes the estimated weights not reliable, the performance of the FWM filter in noise reduction in spatial noisy image domain is affected. In the preferred embodiment, the FWM filter is applied to the multiscale representation of the noisy image with wavelet transform; particularly, it is only used for smoothing the class of edge-related and regular coefficients at different scales. Since the wavelet functions in the horizontal and vertical orientations are selected to be the first partial derivatives of the cubic spline, the translation-invariant wavelet-transform works like the Canny edge detector. Wavelet coefficients with large magnitudes correspond to edges in the smoothed image. As a result, when the FWM filter is applied to the wavelet transform domain for noise reduction, the large difference between the central wavelet-coefficient and one of its neighboring wavelet coefficients indicates the presence of an edge, and the corresponding weight in the FWM filter will be set small, so that less contribution is made from the neighboring coefficient to the filtered central coefficient. On the contrary, the small difference indicates the absence of edges between the two wavelet coefficients and they belong to the same homogeneous region in the image, and the weight is set large, so that more contribution is made from the corresponding neighboring coefficient to filtering the central coefficient.

The advantage of the wavelet-based multiscale FWM-based filtering over the single-scale FWM-based filtering is that as the wavelet decomposition level is increased, noise is expected to be weak and it has less influence on the determination of the weights of the FWM filter, therefore, the weights of the FWM filter are more reliable making the multiscale FWM-based filtering more efficient for noise reduction than the single-scale FWM-based filtering Let $wt_{2^j}^{k,d}(p_1,q_1), \ldots, wt_{2^j}^{k,d}(p_N,q_N)$, $k=1$ or 2, be a set of neighboring wavelet transform coefficients within a window centered at the position of coefficient $wt_{2^j}^{k,d}(p_0,q_0)$ to be filtered in the wavelet transform component $W_{2^j}^{1,d}f$ or $W_{2^j}^{2,d}f$ in Eq. (14), and let N be the number of neighbors. The determination of the weights adopts a bell-shaped fuzzy set centered on zero for the purpose of preserving the edges. Let $$\nabla_l = wt_{2^j}^{k,d}(p_l,q_l) - wt_{2^j}^{k,d}(p_0,q_0), l=0, 1, 2, \ldots N \quad (39)$$

be the difference of wavelet coefficients between the central coefficient $wt_{2^j}^{k,d}(p_0,q_0)$ and its neighbor $wt_{2^j}^{k,d}(p_1,q_1)$. The filtered coefficient of $wt_{2^j}^{k,d}(p_0,q_0)$ is determined as:

$$w\hat{t}_{2^j}^{k,d}(p_0, q_0) = \frac{\sum_{l=0}^{N} \mu_f(\nabla_l) * wt_{2^j}^{k,d}(p_l, q_l)}{\sum_{l=0}^{N} \mu_f(\nabla_l)} \quad (40)$$

where $\mu_f$ is the membership function, which is selected to be a Gaussian function of the coefficient difference $$\mu_f(\nabla_l) = \frac{1}{\sqrt{2\pi}\,\sigma} e^{\frac{(\nabla_l)^2}{2\sigma^2}} \qquad (41)$$

where σ is the scale parameter. The membership function is used to reduce the importance of coefficients that are much different from the central element of the window. Since in the wavelet transform domain, noise variance is expected to be decreased as the decomposition level is increased, the scale parameter σ can be set large when the scale is small and vice versa to smooth out noise while preserving details. The parameter σ at different scales with respect to different noise variances is different.

Figure 7:
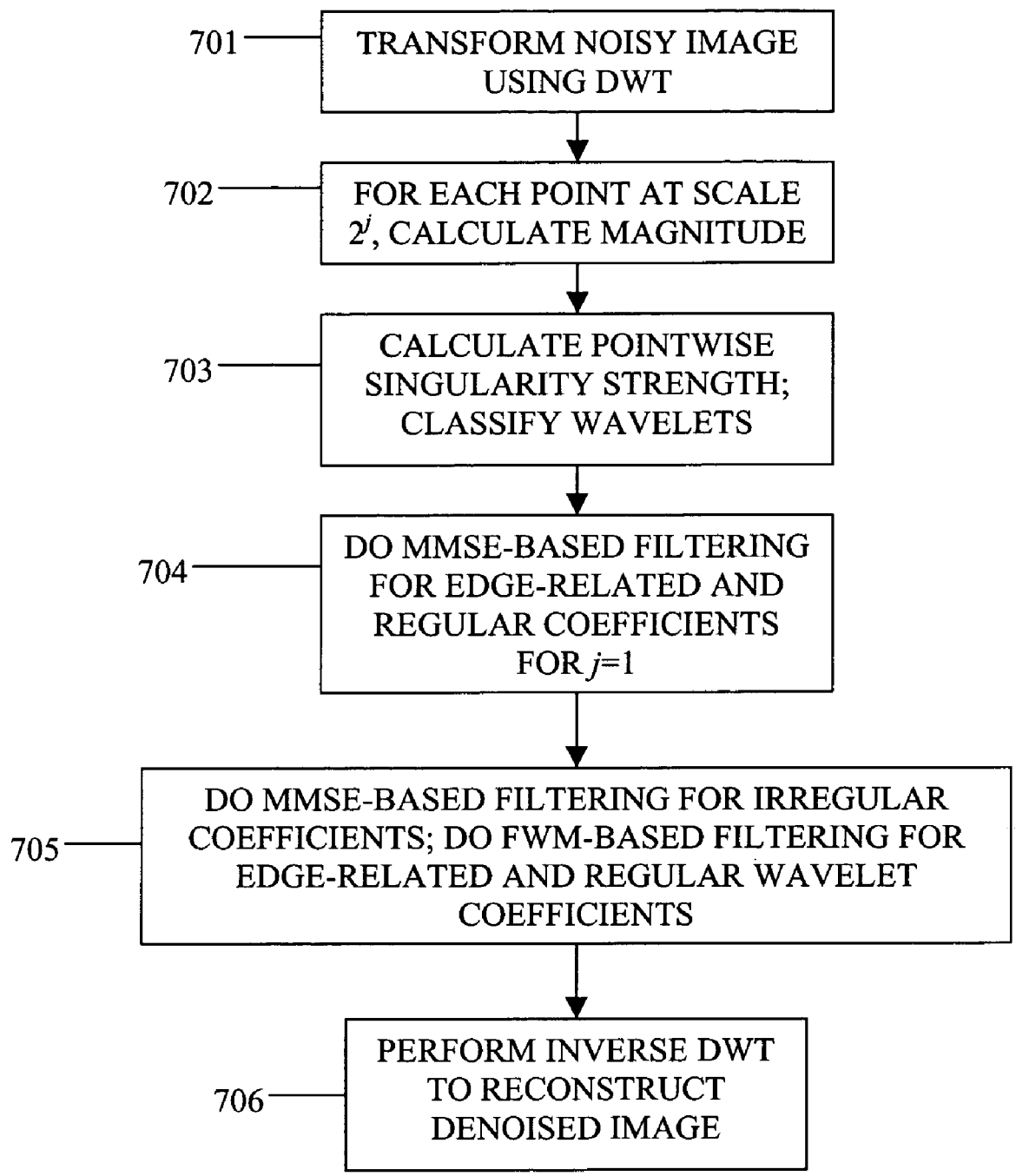
FIG. 7 shows a flow chart of the preferred embodiment.

The proposed denoising algorithm based on wavelets and multifractals for singularity detection (WMFSD) can be summarized as follows, with reference to the flow chart of FIG. 7:

Step 701: Transform the noisy image using DWT with 4 levels obtaining the components: $(W_{2^j}^{1,d}f)_{1 \leq j \leq 4}$, $(W_{2^j}^{2,d}f)_{1 \leq j \leq 4}$, and $S_{2^4}^d f$.

Step 702: For each point (x,y) at scale $2^j$, calculate the magnitude $M_{2^j}(x,y)$ according to Eq. (11).

Step 703: For each scale $2^j$, calculate the pointwise singularity strength according to Eq. (31), and classify each wavelet coefficient into one of two categories by thresholding the pointwise singularity strength. One class corresponds to the irregular wavelet coefficients, and the other corresponds to the edge-related and regular wavelet coefficients.

Step 704: Do MMSE-based filtering for the edge-related and regular coefficients in $(W_{2^j}^{1,d}f)_{j=1}$ and $(W_{2^j}^{2,d}f)_{j=1}$ as the first pass of noise reduction.

Step 705: For $(W_{2^j}^{1,d}f)_{1 \leq j \leq 4}$ and $(W_{2^j}^{2,d}f)_{1 \leq j \leq 4}$, perform the MMSE based filtering for the irregular wavelet coefficients as described above. Perform the FWM-based filtering for the edge-related and regular wavelet coefficients as described above. The edge-related and regular wavelet coefficients in $(W_{2^j}^{1,d}f)_{j=1}$ and $(W_{2^j}^{2,d}f)_{j=1}$ have been filtered in Step 704. Keep $S_{2^4}^d f$ without doing any modifications.

Step 706: Perform inverse DWT on the denoised wavelet transform components, $(\hat{W}_{2^j}^{1,d}f)_{1 \leq j \leq 4}$ and $(\hat{W}_{2^j}^{2,d}f)_{1 \leq j \leq 4}$ and the low-pass component $S_{2^4}^d f$ to reconstruct the denoised image.

Figure 4A:
FIGS. 4A-4F show examples of denoising in the images of FIGS. 1A-1C.
Figure 4B:
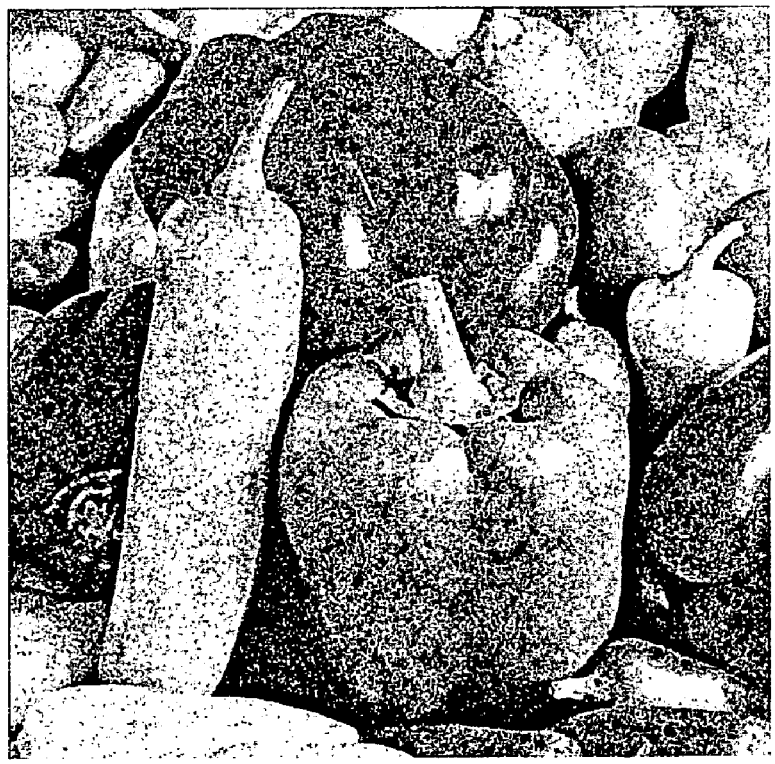
Figure 4C:
Figure 4D:
Figure 4E:
Figure 4F:
Figure 5A:
FIGS. 5A-5F show examples of denoising in the images of FIGS. 2A-2C.
Figure 5B:
Figure 5C:
Figure 5D:
Figure 5E:
Figure 5F:
Figure 6A:
FIGS. 6A-6F show additional examples of denoising.
Figure 6B:
Figure 6C:
Figure 6D:
Figure 6E:
Figure 6F:

Experimental results will now be described in greater detail. The performance of the proposed WMFSD algorithm in image noise reduction was evaluated using the 512×512 testing images of Peppers, Lena, and Barbara. The additive white Gaussian noise is added to these images with different noise variances. The WMFSD algorithm was compared with one of the state-of-the-art denoising algorithms, the efficient wavelet-based image denoising (EWID) algorithm. For the purpose of getting a complete comparison from both PSNR and visual quality, the EWID was implemented. The noisy images of Peppers, Lena, and Barbara with noise variance 225 are shown in FIGS. 4A, 5A and 6A, respectively, while the noisy images with noise variance 625 are shown in FIGS. 4B, 5B and 6B, respectively. The denoised images for noise variance 225 with the preferred embodiment are shown in FIGS. 4C, 5C and 6C, while the denoised images for noise variance 225 with EWID are shown in FIGS. 4D, 5D and 6D. The denoised images for noise variance 625 with the preferred embodiment are shown in FIGS. 4E, 5E and 6E, while the denoised images for noise variance 625 with EWID are shown in FIGS. 4F, 5F and 6F.

For the denoised image of Peppers, the preferred embodiment achieved higher PSNR values than the EWID algorithm. Compared with FIG. 4D, FIG. 4C has less blurring for the long pepper. Also, FIG. 4E has less blurring than FIG. 4F for the long pepper.

For the denoised image of Lena, the preferred embodiment achieved higher PSNR and better visual quality than the EWID algorithm. For a clear comparison, only the face region of the Lena image is displayed. There are more distortions in FIGS. 5D and 5F for the EWID algorithm than in FIGS. 5C and 5E for the preferred embodiment.

For the denoised image of Barbara, the preferred embodiment achieved higher PSNR values and better visual quality than the EWID algorithm when noise variance is 225. In FIG. 6D, some streaks of the tie are seriously blurred, but they are very clear in FIG. 6C. But as the noise variance is increased, the EWID achieves better performance, as shown in FIGS. 6E and 6F.

By comparing the denoising performance for the 3 images, we can say that on average, the preferred embodiment is more efficient than the EWID algorithm. Although both the WMFSD and EWID algorithm performed MMSE-based filtering for wavelet coefficients, the WMFSD achieved better denoising performance. The reason is that in the EWID algorithm, the MMSE estimation procedure was applied to the whole wavelet transform coefficients including the edge-related coefficients, and there is no guarantee for the MMSE-based filtering that no artifacts are generated. Since in the MMSE estimation procedure, wavelet coefficients are assumed as observing zero-mean Gaussian distribution, and the variance is estimated from the local observed noisy wavelet coefficients within a small window. This zero-mean assumption may be inadequate for the edge-related coefficients, since the mean at this situation may not be zero, and a biased-mean model should be used. However, in the WMFSD algorithm of the preferred embodiment, the MMSE-based filtering is only performed for the irregular coefficients and it will not introduce artifacts since the irregular coefficients are mostly located at the homogeneous regions of the noise-free image, and the zero-mean model for the irregular coefficients is adequate. Although the MMSE-based filtering was performed for the edge-related coefficients located at the finest scale, it will not introduce very serious artifacts to the denoised image since noise is dominant there and signal components are comparatively weak. Even if there are some artifacts, the second pass of FWM-based filtering can help smooth some of them.

In addition, the FWM-based filtering for the edge-related and regular coefficients at all scales can help preserve edges when reducing noise.

The parameter σ used in the fuzzy membership function for different scales with respect to different noise variances is shown in Table I below:

TABLE I

| Decomposition | Parameter σ vs. noise variance | | |
|---|---|---|---|
| level | 225 | 400 | 625 |
| 1 | 14 | 24 | 30 |
| 2 | 9 | 12 | 18 |
| 3 | 6 | 8 | 12 |
| 4 | 3 | 4 | 4 |

The performance (peak signal to noise ratio PSNR in dB) of the proposed WMFSD algorithm compared with the EWID algorithm for the images of Lena, Barbara and Peppers is set forth in Table II below. The results of EWID are from the inventor's implementation rather than from the original paper, but there are almost no differences.

TABLE II

| | | Noise Variance Versus PSNR | | |
|---|---|---|---|---|
| Algorithm | Image | 225 | 400 | 625 |
| WMFSD | Lena | 32.72 | 31.36 | 30.17 |
| | Barbara | 29.65 | 27.85 | 26.57 |
| | Peppers | 32.30 | 30.92 | 29.91 |
| EWID | Lena | 32.35 | 31.01 | 29.98 |
| | Barbara | 29.27 | 27.88 | 26.83 |
| | Peppers | 31.82 | 30.56 | 29.53 |

Another technique which can be used in conjunction with the above algorithm is the dyadic wavelet transform based multiscale anisotropic diffusion. The anisotropic diffusion equation is as follows:

$$\frac{\partial I(x, y, t)}{\partial t} = \mathrm{div}[g(\|\nabla I\|)\nabla I] \quad (42)$$

$$I(x,y,t+1) = I(x,y,t) + \mathrm{div}[g(\|\nabla I\|)\nabla I] \quad (43)$$

where div denotes divergence and t is the time variable. The function g is the edge-stopping function, which is a monotonically decreasing function of the image gradient. In discrete image domain, the anisotropic diffusion equation is discretized as following:

$$I(x, y, t+1) = I(x, y, t) + \frac{\lambda}{|N_{(x,y)}|} \sum_{(p,q) \in N_{(a,r)}} g(\nabla I_{(p,q)}^{(x,y)}) \nabla I_{(p,q)}^{(x,y)} \quad (44)$$

where $N_{(x,y)}$ denotes the neighborhood support of point (x,y) and $$\nabla I_{(p,q)}^{(x,y)} = I(p,q,t) - I(x,y,t), (p,q) \in N_{(x,y)}. \quad (45)$$

In one embodiment, the anisotropic diffusion coefficient function g is selected as $$g(x) = \exp\left[-\left(\frac{x}{k}\right)^2\right] \text{ or } g(x) = 1 \Big/ \left(1 + \frac{x^2}{k^2}\right). \quad (46)$$

Other possibilities for the edge-stopping function g are known in the art. From (45), one can know that the anisotropic diffusion model is very sensitive to noise since the partial differential equation (PDE) in (44) contains the first order partial derivative for gradient measurement. So when this model is applied to reducing noise, the gradients for edge detection are sensitive to noise. In addition to edges, noise can also exhibit high gradients in the noisy image. That is to say, the gradients are no longer reliable for edge detection and the denoising performance of the anisotropic diffusion will be much affected. In order to solve the noise-sensitivity problem in the existing anisotropic diffusion models, the wavelet-based multiscale anisotropic diffusion model is developed. Instead of directly applying the anisotropic diffusion model to the noisy image for noise reduction, it is proposed to perform the anisotropic diffusion on the dyadic wavelet transform domain. Since as scale increases, noise tends to decrease in wavelet transform domain, noise has less influence on the calculation of gradients and the anisotropic diffusion coefficients under this situation are more reliable. The dyadic wavelet transform coefficients are more stationary than the raw noisy image. Within this framework, any other anisotropic diffusion models can be applied to the dyadic wavelet transform domain for noise reduction.

But at the finest scale of the dyadic wavelet transform domain, noise is dominant there, and the anisotropic diffusion on this scale is still not efficient. In order to further reduce noise, the wavelet coefficients at the finest scale are first denoised with the MMSE-based filter, which was described above with reference to Eq. (34) to Eq. (38), and the anisotropic diffusion model is performed as the second pass of further enhancement and denoising. Any other denoising techniques performed on the finest scale for further reducing noise without generating artifacts can be used to replace the MMSE-based filtering within this framework.

For the application of the algorithm of wavelet-based multiscale anisotropic diffusion and adaptive statistical analysis in cone beam CT medical imaging, each noisy filtered projection image is decomposed into 4 levels using the DWT. The MMSE-based filtering described above from Eq. (34) to Eq. (38) is applied to the finest scale for noise reduction. Then the anisotropic diffusion model is applied to the wavelet transform domain at each scale for noise reduction. Finally we reconstruct the filtered and denoised projection image with the inverse DWT algorithm. After all the filtered projection images are denoised, the 3D CT image is reconstructed from all the denoised and filtered projection images with the Feldkamp cone beam CT reconstruction algorithm. This algorithm can be used to reduce noise for other kinds of CT imaging.

Another modification of the preferred embodiment will now be disclosed.

The proposed wavelet coefficient magnitude sum (WCMS) algorithm according to this modification of the preferred embodiment will now be described. First, for each point at each scale, its WCMS is calculated. The wavelet coefficients at each scale are classified into two categories by thresholding the inter-scale WCMS ratio. One corresponds to the edge-related and regular signal coefficients, and the other corresponds to the irregular coefficients. Instead of simply discarding the irregular coefficients as done in the WTMS algorithm, we use the approximate MMSE estimation method to restore the signal components from the irregular coefficients. For the edge-related coefficients and regular coefficients, if they are located at the lowest decomposition level, they are further denoised using the MMSE scheme, but if they are located at the other higher decomposition levels, no modifications are made to them so as to avoid any blurring artifacts and preserve the regularity of the denoised image.

Figure 9:
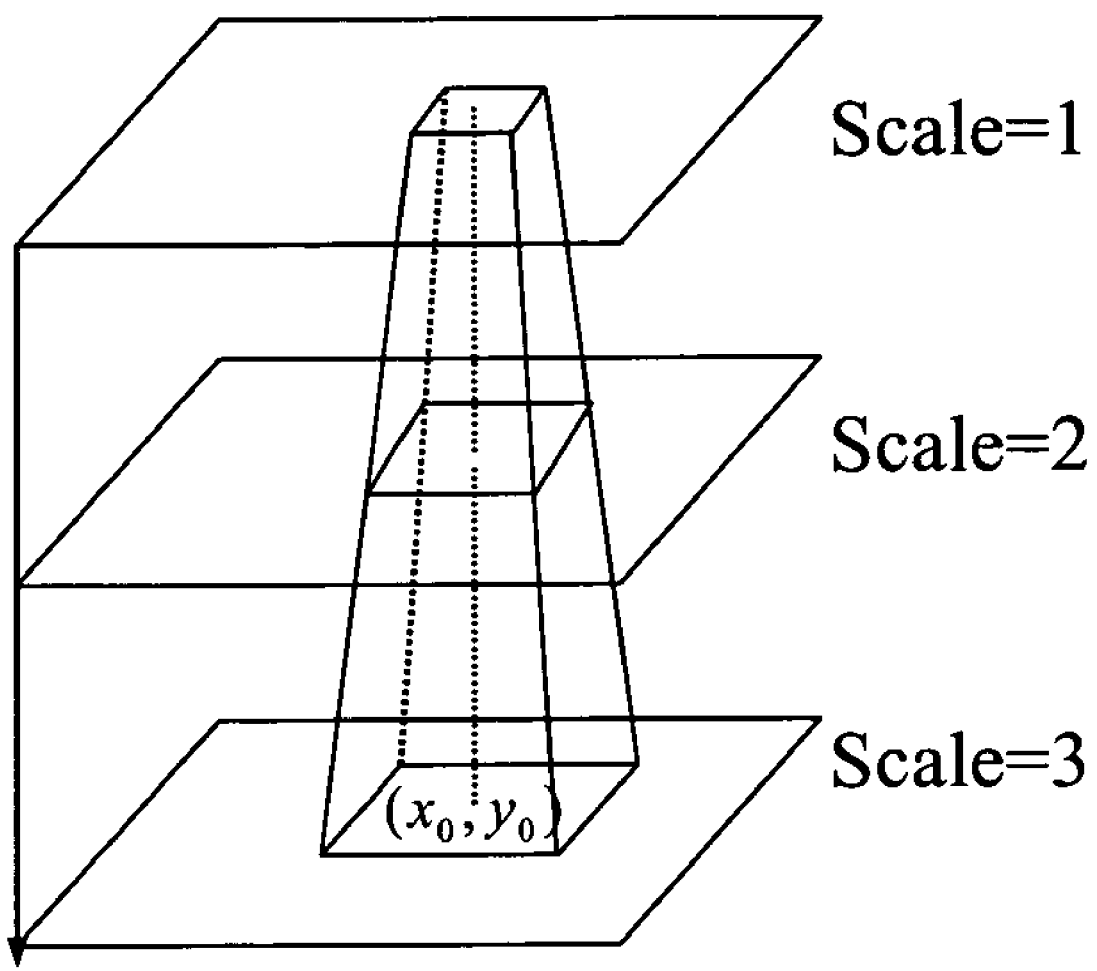
FIG. 9 shows a two-dimensional cone of interest used in a variation of the preferred embodiment.

In 2-D wavelet transform domain, for each point $(x_0, y_0)$ at scale $2^j$, the 2-D cone of influence (COI) is defined as a set of points within a rectangle region $$COI_{(x_0,y_0)} = \{(x,y): |x-x_0| \le K2^j, |y-y_0| \le L2^j\} \quad (47)$$

where K and L are the half support of wavelet filters for wavelet transform in the horizontal and vertical directions, respectively. The 2-D COI is different from the 2-D directional cone of influence (DCOI) defined in the WTMS algorithm and is shown in FIG. 9:

$$DCOI_{(x_0,y_0)}^j = \quad (48)$$
$$\left\{(x, y): (x-x_0)^2 + (y-y_0)^2 \le K2^{2j}, \frac{y-y_0}{x-x_0} = \tan(\mathrm{Arg}_{2^j} f(x_0, y_0))\right\}$$

The definition of 2-D COI in this variation of the preferred embodiment is more computationally efficient than that of the 2-D DCOI in the WTMS algorithm, in which the linear interpolation operation has to be performed within a disk region to determine the 2-D DCOI. An operator N is defined like that in the WTMS algorithm, dubbed the wavelet coefficient magnitude sum (WCMS) for all points (x,y) within the 2-D COI $$N_{2^j}f(x_0,y_0) = \Sigma M_{2^j}f(x,y), (x,y) \in COI_{(x_0,y_0)}^j. \quad (49)$$

If a wavelet coefficient at $(x_0,y_0)$ satisfying the following inter-scale WCMS relationship, then the coefficient at $(x_0,y_0)$ is regarded as corresponding to a regular signal coefficient or an edge-related coefficient, $$\frac{N_{2^{j+1}}f(x_0, y_0)}{N_{2^j}f(x_0, y_0)} = 2^{\alpha+1} \geq 2, \alpha >= 0 \quad (50)$$

where $\alpha$ is related to the local signal smoothness, discontinuity and singularity. Otherwise the wavelet coefficient at point $(x_0,y_0)$ is classified as an irregular coefficient.

With the classification of wavelet coefficients, we can know the irregular wavelet coefficients are mostly located at the homogeneous regions of the noise-free image. As a result, we can make sure that noise in the irregular coefficients can be reduced as much as possible without introducing blurring artifacts to the edges in the denoised image. For this purpose, the approximate minimum mean square error (MMSE) estimation procedure is incorporated to achieve a high SNR value. When the MMSE estimation scheme is applied to the edge-related and regular coefficients at the lowest decomposition level, since noise is dominant there, no serious artifacts will be introduced to the edges. The noise-free wavelet coefficients are modeled as observing a zero-mean normal distribution $N(0,\sigma^2(x,y))$. The $\sigma^2(x,y)$ is unknown and space-varying and it can be estimated from the local noisy wavelet coefficients within a square window centered at the point (x,y). The local noise-free signal variance a 2(x y) is estimated $$\hat{\sigma}^2(x, y) = \max\left\{0, \frac{1}{|N_{(x,y)}|} \sum_{(p,q) \in N_{(x,y)}} [c(p, q)]^2 - \sigma_n^2\right\}, \quad (51)$$

where $|N(x,y)|$ denotes the number of neighbors of a wavelet transform coefficient c(x,y) at the wavelet transform component of $W_{2^j}^1 f(x,y)$ or $W_{2^j}^2 f(x,y)$. The noise standard deviation $\sigma_n$ is estimated using a robust estimation way, the median absolute deviation of wavelet coefficients in the lowest decomposition level divided by 0.6745, $$\hat{\sigma}_n = \text{Median}(|c(x,y)|)/0.6745, \quad (52)$$

where c(x,y) denotes a wavelet coefficient at wavelet transform component $W_{2^j}^1 f(x,y)$ or $W_{2^j}^2 f(x,y)$ at the lowest decomposition level.

After the signal variance is estimated, the filtered value of c(x,y) at $W_{2^j}^1 f(x,y)$ or $W_{2^j}^2 f(x,y)$ is $$\hat{c}(x, y) = \frac{\hat{\sigma}^2(x, y)}{\hat{\sigma}^2(x, y) + \sigma_n^2} c(x, y). \quad (53)$$

Figure 8:
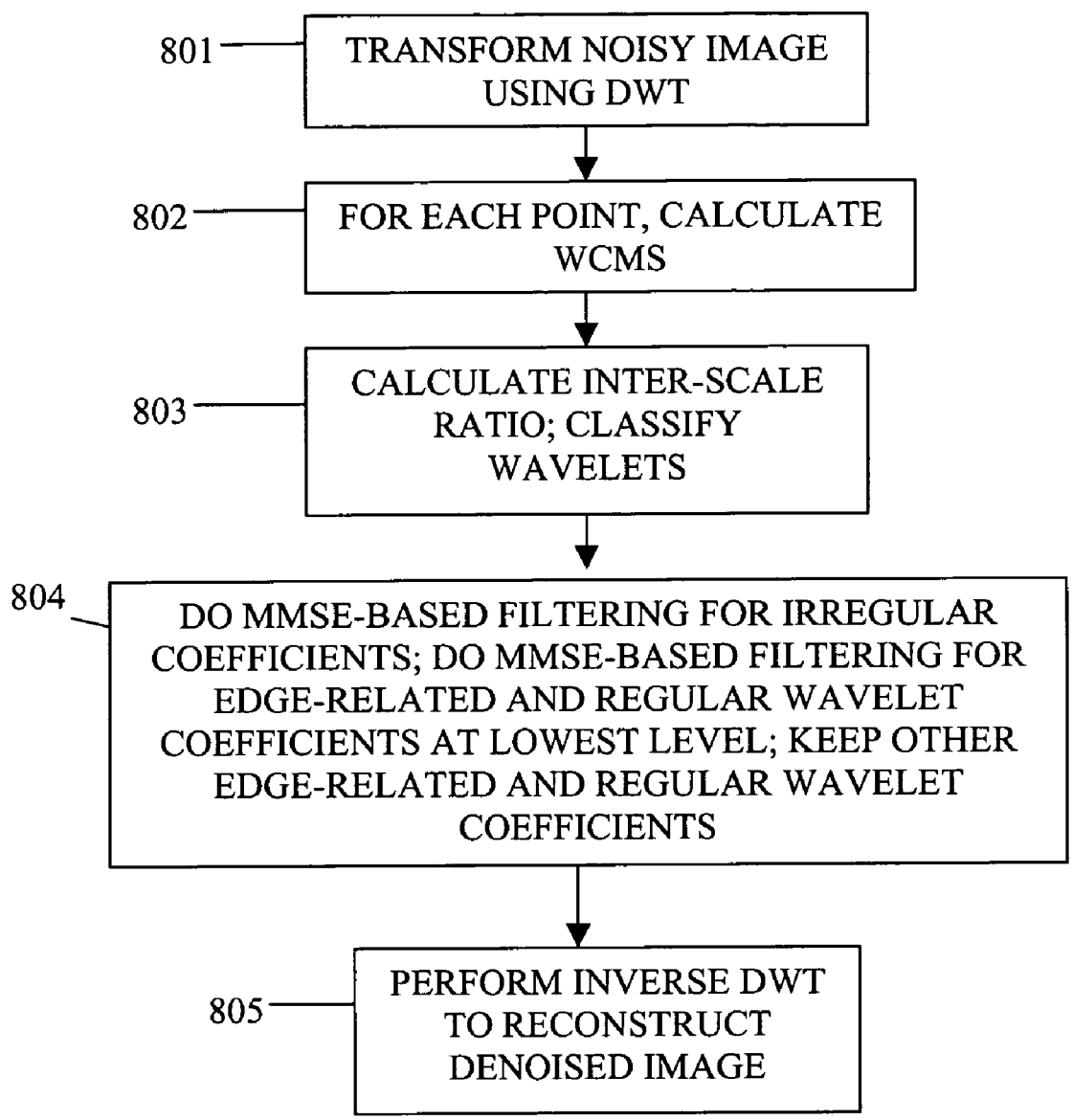
FIG. 8 shows a flow chart of a variation of the preferred embodiment of FIG. 7.

The proposed WCMS denoising algorithm customized for cone beam CT breast imaging can be summarized as follows with reference to the flow chart of FIG. 8:

Step 801: Transform each filtered projection image using the discrete dyadic wavelet-transform with 4 levels to obtain the smoothed image $S_{2^4}$ and a set of detailed wavelet transform components $\{W_{2^j}^1 f(x,y), W_{2^j}^2 f(x,y)\}_{j=1, 2 \ldots 4}$.

Step 802: For each point (xy), calculate the magnitude $M_{2^j}(x,y)$ and $N_{2^j}f(x,y)$ with Eq. (11) and Eq. (49).

Step 803: For each scale $2^j$, according to the inter-scale ratio of the WCMS defined in formula (50), classify the wavelet coefficients into two categories. One corresponds to the edge-related and regular wavelet coefficients, and the other corresponds to irregular wavelet coefficients. This classification result is used as a mask $\text{Mask}_{2^j}(x,y)$ for the wavelet transform components $W_{2^j}^1 f(x,y)$ and $W_{2^j}^2 f(x,y)$.

Step 804: According to the mask $\text{Mask}_{2^j}(x,y)$ obtained in Step (3), do noise reduction for the two classes of wavelet coefficients at wavelet transform components $W_{2^j}^1 f(x,y)$ and $W_{2^j}^2 f(x,y)$. For the irregular wavelet coefficients, perform MMSE-based filtering as described above, while for the edge-related and regular coefficients, if they are located at the lowest decomposition level, perform MMSE-based filtering as described above, but if they are located at other higher decomposition levels, keep them without doing any modifications.

Step 805: Perform the inverse discrete dyadic wavelet transform on $S_{2^4}$ and the denoised wavelet transform components $\{\hat{W}_{2^j}^1 f(x,y), \hat{W}_{2^j}^2 f(x,y)\}_{j=1, 2 \ldots 4}$ to reconstruct the denoised image.

While a preferred embodiment and variations thereon have been set forth above, those skilled in the art who have reviewed the present disclosure will readily appreciate that other embodiments can be realized within the scope of the invention. For example, any suitable computing device can be used, as can any suitable input and output devices. Also, when certain algorithms known in the art are disclosed as being used within the present invention, equivalents may be used. Furthermore, numerical values are illustrative rather than limiting. Therefore, the present invention should be construed as limited only by the appended claims.

I claim:

1. A method for denoising a noisy image, the method comprising: using a processor to perform the steps of:
    (a) transforming the noisy image using a wavelet transform with a plurality of levels to obtain a plurality of components;
    (b) for each point in the wavelet transform domain at each of the plurality of levels, calculating the magnitude from the two wavelet coefficients at the same position and same scale in the wavelet transform components from the plurality of components obtained in step (a);
    (c) for each of the plurality of levels, calculating a pointwise singularity strength from the magnitudes calculated in step (b) and classifying each wavelet coefficient into a class of irregular wavelet coefficients or into a class of edge-related and regular wavelet coefficients in accordance with the pointwise singularity strength;
    (d) performing a MMSE-based filtering on the edge-related and regular coefficients in a subplurality of the components;
    (e) for a second subplurality of the components, performing an MMSE-based filtering on the irregular wavelet coefficients and an FWM-based filtering for the edge-related and regular wavelet coefficients; and
    (f) performing an inverse wavelet transform to reconstruct the denoised image.

2. A method for denoising a noisy image, the method comprising: using a processor to perform the steps of:

(a) transforming the noisy image using a wavelet transform with a plurality of levels to obtain a plurality of wavelet transform components and an approximation component;
(b) for each point at each scale, calculating the magnitude from the two wavelet coefficients at the same position and the same scale in the two wavelet transform components obtained in step (a);
(c) for each of the plurality of levels, calculating the wavelet coefficient magnitude sum (WCMS) for each point, then calculating an inter-scale ratio from the WCMS just calculated and classifying each wavelet coefficient into a class of irregular wavelet coefficients or into a class of edge-related and regular wavelet coefficients in accordance with the inter-scale ratio;
(d) performing a MMSE-based filtering on the irregular wavelet coefficients;
(e) performing a MMSE-based filtering on a subplurality of the edge-related and regular wavelet coefficients; and
(f) performing an inverse wavelet transform to reconstruct the denoised image.

3. The method of claim 2, wherein the wavelet transform of step (a) is a discrete dyadic wavelet transform.

4. The method of claim 2, wherein, in step (e), the subplurality of the edge-related and regular wavelet coefficients are the edge-related and regular wavelet coefficients of the lowest one of the plurality of levels.

* * * * *